United States Patent [19]
Sowbhagya et al.

[11] Patent Number: 6,083,551
[45] Date of Patent: Jul. 4, 2000

[54] **NOODLES/VERMICELLI FROM MAIZE (CORN, *ZEA MAYS* L.) AND A PROCESS FOR ITS PREPARATION**

[75] Inventors: Chakrabhavi Mallappa Sowbhagya; Syed Zakiuddin Ali, both of Mysore, India

[73] Assignee: Council of Scientific & Industrial Research, New Delhi, India

[21] Appl. No.: 09/162,171

[22] Filed: Sep. 28, 1998

[51] Int. Cl.[7] ....................................................... A23L 1/16
[52] U.S. Cl. ........................... 426/557; 426/451; 426/516
[58] Field of Search ................................... 426/557, 451, 426/516

[56] References Cited

U.S. PATENT DOCUMENTS

| | | | |
|---|---|---|---|
| 3,615,677 | 10/1971 | Scharschmidt et al. | 426/557 |
| 3,780,186 | 12/1973 | Troy | 426/557 |
| 3,846,563 | 11/1974 | Cunningham | 426/557 |
| 3,928,631 | 12/1975 | Freeman et al. | 426/18 |

OTHER PUBLICATIONS

Ch. Hummel, "Macaroni Products", pp. 17–19, 1966.
Gessner G. Hawley, "The Condensed Chemical Dictionary", p. 944, 1981.
Watson et al., "Corn Chemistry and Technology", p. 480, 1994.

*Primary Examiner*—Lien Tran
*Attorney, Agent, or Firm*—Ladas & Parry

[57] ABSTRACT

A noodles/vermicelli made from maize having the following characteristics:
  Solid loss during 10 min cooking % 7.4–9.3,
  Texture of cooked noodle:firmness % 36.8–39.3,
  Elastic recovery % 12.1–12.5,
  WAI (g/g) 5.4–5.6,
  WSI % 3.9–4.0,
  Amylose content % 30.3–31.2, and a process for preparing the noodles/vermicelli.

16 Claims, 2 Drawing Sheets

TEXTURE OF COOKED NOODLES (%)

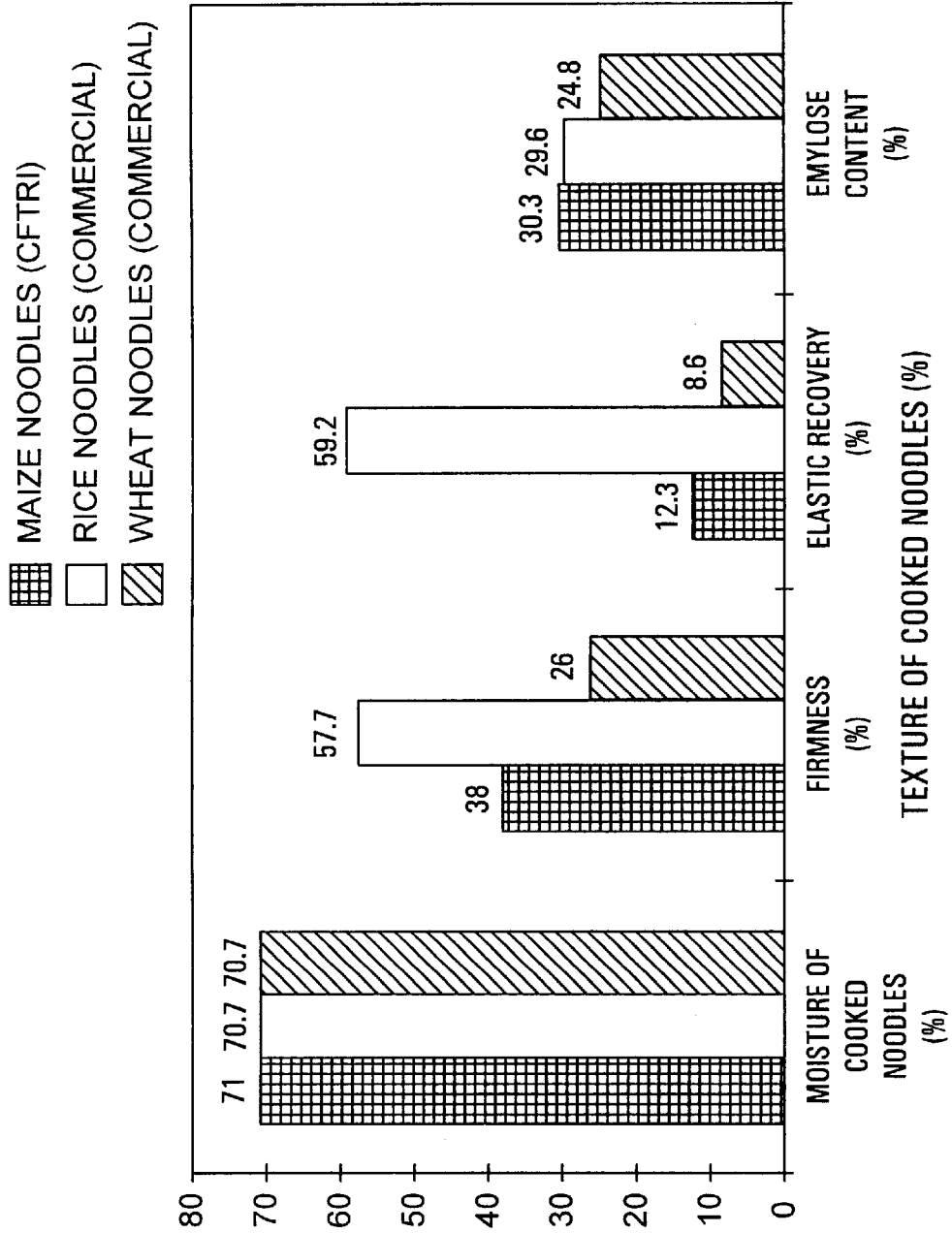
F I G. 1A

NOODLES/VERMICELLI FROM MAIZE (CORN, *ZEA MAYS* L.) AND A PROCESS FOR ITS PREPARATION

FIELD OF INVENTION

This invention relates to noodles/vermicelli from maize and a process for its preparation. The noodles/vermicelli of the present invention give a diversification to its utilization for food purpose with value added products and to add novelty to the product range.

BACKGROUND OF INVENTION

No reports exist on the preparation of noodles/vermicelli from maize and so there is no prior knowledge available for making maize noodles/vermicelli. However, knowledge for preparing noodles/vermicelli from wheat exists. Many brands of wheat noodles and vermicelli are presently available in the Indian and international market. There are many variations in the household and commercial processes that are practiced for the production of wheat noodles/vermicelli. A very common method is to make dough using wheat flour, extrude it through forming dies and dry the product in a drier, with hot air (about 60° C.) or in the sun till the moisture is reduced to about 12% (wet basis) before packing. (Dick and Matsuo 1988).

Of late, noodles prepared from other cereal grains are also appearing. However, due to lack of 'gluten' in cereals other than wheat, it is difficult to make noodles/vermicelli type of products similar to those prepared from wheat, based on the process used for wheat. Rice noodles are a household product of antiquity in China, Japan, India and other Asian countries which are prepared just before consumption. [K.K. Shimiadaya Honten. Japanese Examined Patent No. 5704220 (5704220), 1982; T. Miyatake. Japanese— Examined Patent No. 5617059 (5617059), 1981; G. Buehler A. G. West-German Patent Application No. 1301237 (1301237)]. Commercial rice noodles have appeared only recently in India. For preparing these noodles the common process is to gelatinize the flour partially or mix a fully gelatinized flour with raw flour, make dough, boil in water and extrude through appropriate dies, steam and dry. (C. M. Sowbhagya, Dr. S. Z. Ali. Patent Application No. 688/DEL/96, filed).

It has not been possible to make noodles from maize, based on the processes hitherto known as applied for wheat or rice. Firstly because it does not contain the gluten, which is the vital protein in wheat, which hydrates, swells and forms dough of elastic nature (Moss, et al 1987). Secondly, the dough prepared from maize flour with cold water, lacks cohesiveness and elasticity and does not yield noodles/vermicelli that cook well and retain their textural properties. Thirdly, the dough prepared from partially or fully gelatinized flours from maize, as prepared in the case of rice noodles, yields a good looking product, but the noodles/vermicelli disintegrate on cooking, into a paste. It is therefore not possible with the known methods to prepare noodles/vermicelli from maize.

SUMMARY OF INVENTION

The main object of the present invention is to provide a process for making noodles/vermicelli from maize having low fat content and to give a diversification for utilization of maize for food purpose.

In the present invention the products noodles/vermicelli from maize have the following characteristics.

a) Solid loss during 10 min. cooking (%) 7.4–9.3
b) Texture of cooked rice:
   Firmness (%) 36.8–39.3
   Elastic recovery (%) 12.1–12.5
c) WAI (g/g) 5.4–5.6
d) WSI (%) 3.9–4.0
e) Amylose content (%) 30.3–31.2

Accordingly, the present invention provides a process for the preparation of noodles/vermicelli having the characteristics given above which comprises: of: a) providing Maize grits obtained by conditioning maize with water and tempering and later milling in maize milling machines; (b) soaking degermed and debranned maize grits in excess water containing sulphur dioxide, (c) draining of excess water, washing and drying to obtain a product of desired moisture, (d) grinding the dried material to make a fine powder, (e) adding salt to taste, (f) mixing with water thoroughly, (g) sieving so as to break lumps, (h) steaming at atmospheric pressure followed by, (i) making a dough using boiling water, (j) extruding through a press of desired size, (k) steaming at atmospheric pressure and (l) drying.

The process is further described in detail below.

BRIEF DESCRIPTION OF THE DRAWING

The drawing is a chart providing a comparison of the quality characteristics of maize noodles of the invention with commercial rice and wheat noodles.

DETAILED DESCRIPTION

Figure 1B:
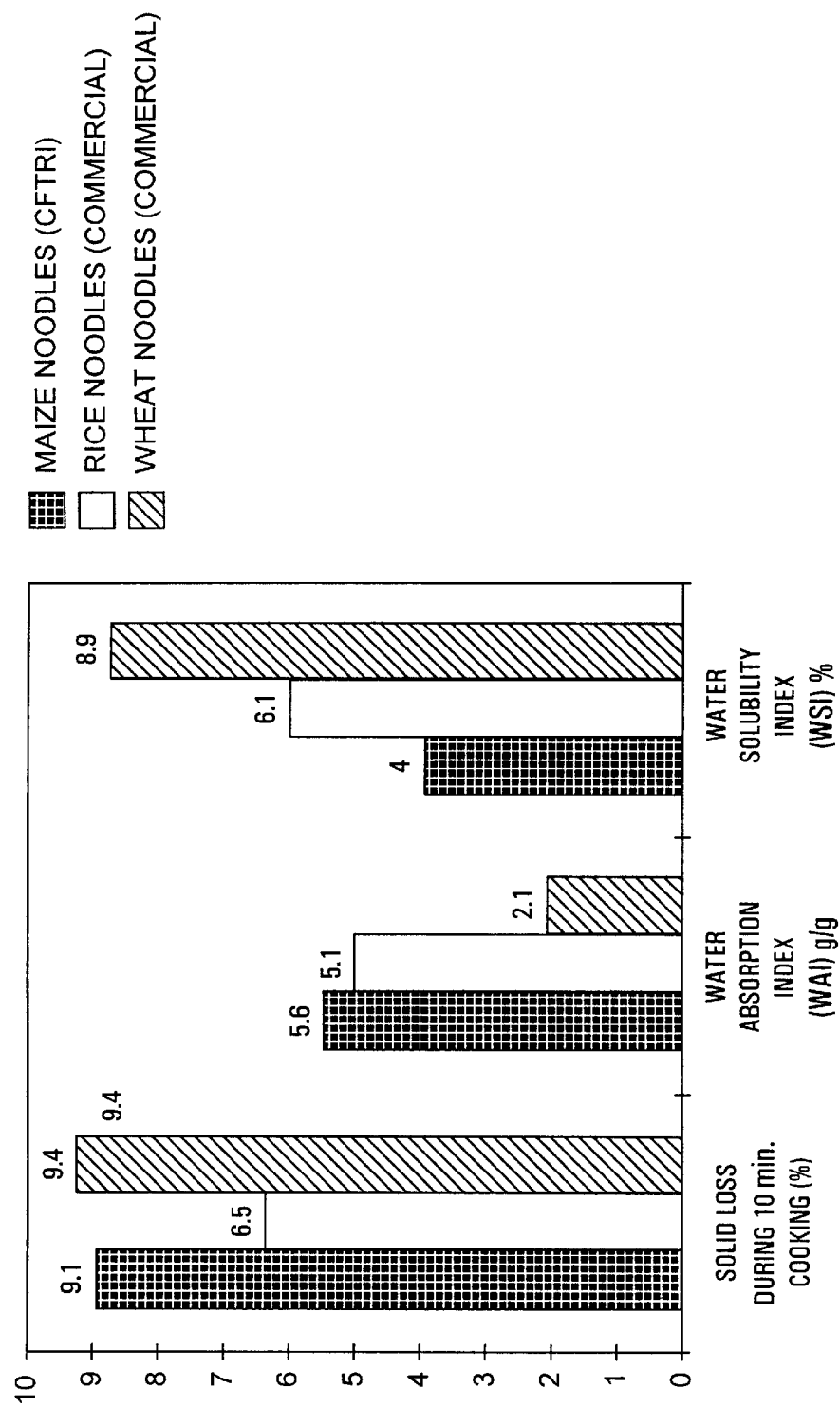

Degermed, debranned and low fat (preferably of <1.0%) maize grits, produced by dry milling of maize are used as raw-material. Use of such grits extend the keeping quality of flour/product. Maize grits may be prepared by any known method involving degerming and debranning of maize and recovery of the grits. The salient features of such dry milling process include application of appropriate moisture, conditioning and tempering for a specified time and passing through unit operation machinery for obtaining different fractions like grits, flour, semolina, husk, bran and germ (Watson 1984). The grits are soaked in excess water (amount of water may range from 130% to 150% by weight) in excess water containing sodium metabisulphite or potassium metabisulphite, equivalent to a concentration of about 0.05–0.3% $SO_2$ for a period preferably of 8 to 20 hr. at temperature preferably of 30–60 ° C. Sulphur dioxide has been shown to cause gradual swelling of the protein matrix in maize making the protein more globular and finally its dispersion, thus releasing starch from the matrix. Sulphite or bi-sulphite ions have been shown to react with the sulphidryl groups of cystine, reducing the disulphite linkage and giving rise to different protein fractions, thus weakening the glutelin matrix (Cox, et al 1964, Wall 1971, Watson 1987). The use of sulphur dioxide thus facilitates the separation of starch granules from the protein matrix in situ which helps in proper binding of the cooked material, promoting starch-starch interaction in such a way that it render s stability to the cooked product during reconstitution and also helps in reducing the loss of solids from the product. The excess water in maize grits is drained off, the grits washed with fresh water and dried either in sun or suitable hot air drier, to about 12–14% moisture (wet basis), cooled and stored. Dried grits are ground to fine powder in a suitable grinder (emery, chakki or pin mill). The particle size should be such that about 90% passes through 60 mesh sieve. To one part of maize flour is added common table salt, the preferable amount being 1–2% and mixed with water thoroughly preferably by passing through 18 mesh sieve to break lumps formed during mixing. The amount of water used for the mixing may preferably range between 15–20%. The flour is then steamed for a period preferably for 5 to 30 min at atmospheric pressure. This initial steaming of the maize flour, after adjusting to appropriate moisture range between 25–28% and then making the dough using boiling water gelatinizes the starch to a desirable extent that helps in the better cohesion and stability of the noodle strands. Lumps are broken once a gain and the flour is added to boiling water (preferably at 1 to 1.1 part by weight). The contents are continuously stirred for about 1–2 min. keeping the heat source on and mixed into dough. The dough is divided into balls after thorough a kneading and extruded through noodle/vermicelli press using die of proper aperture (such as 1 mm–1.5 mm holes). The extruded strands could be collected either as long strands or in rounds depending upon the preference. The freshly extruded noodles are steamed at atmospheric pressure for a period preferably of 20–40 min and dried in a suitable hot air drier at a temperature preferably of 60–90° C. for about 0.5 to 2 hrs. The invention described herein therefore has the great advantage of reducing the criticality of drying conditions that are required for wheat noodles/ vermicelli. In the case of latter, a highly controlled regime of slow drying under appropriate humidity—temperature conditions is required so as to eliminate the risk of cracking during drying, which is avoided in the present invention (Pollini 1996). The dried product is cooled and stored in a suitable container (polyethene bag, tin, plastic box, etc). The product has been analyzed for $SO_2$ content and it was found to be completely free from it. The product is quick-cooking and quite easy to prepare reducing therefore, the time and energy for cooking.

The invention is further illustrated with the following examples which should not, however, be construed to limit the scope of the invention.

EXAMPLE 1

One hundred gm flour obtained by grinding debranned, degermed maize grits (previously soaked in sodium metabisulphite, 0.2% $SO_2$, for 16 hrs, at 50° C., dried and ground in an emery disc grinder) was mixed thoroughly with 20 ml. water and steamed for 15 min. at atmospheric pressure. The flour was added to boiling water and mixed well to form a dough and extruded through 1.2 mm aperture die. The extruded noodle strands were steamed for 30 min. in an autoclave at atmospheric pressure and subsequently dried in a truck drier at 80° C. for 1 hr. Solid loss of the product was tested under standard test conditions (IS 1485, 1976). For this, 5 gm. noodles were cooked in 50 ml. boiling water for 10 min; while maintaining the water level constant. The excess water was strained through fine-mesh, collected carefully and evaporated to dryness—first over a water bath and then in an oven. The dry matter was expressed as percentage in terms of original material taken. Noodles were cooked for optimal sensory level. It was sufficient to add noodles to excess simmering water and setting aside for about 4 to 5 min. and draining the excess water. Alternatively, water heated to 75–80° C. also can be used and noodles allowed to soak by setting aside at room temperature for about 5 min. Textural properties (firmness and elasticity) of the noodles was determined using Viscoelastograph after about 1 hr. of keeping them at room temperature in covered condition (Sowbhagya et al 1987). Water absorption and water solubility indices were determined in the flour made from dry noodles as per standard methods (Schoch 1964) the drawing gives the details of the comparison of the quality characteristics of the maize noodles with commercial rice and wheat noodles. The firmness and elastic recovery values reported here and in Table 1 are for noodles after cooking them in boiling water. The amylose content was determined by the simplified calorimetric method making use of the affinity of Iodine to amylose to give blue colour (Sowbhagya and Bhattacharya 1976).

As seen from the drawing, the texture of maize noodles i.e, firmness and elastic recovery, falls in between those of commercial samples of rice and wheat noodles. Water absorption index was higher and water solubility index lower than the commerical samples. The overall quality of maize noodles thus can be taken to be comparable with those of commercial samples of wheat and rice noodles.

EXAMPLE 2

Two hundred fifty gm of flour prepared from debranned and degermed maize grits (previously soaked in sod.metabisulphite, 0.2% $SO_2$ for 16 hrs at 50° C., dried and ground in an emery disk grinder) was mixed thoroughly with 20 ml. water and steamed for 15 min. at atmospheric pressure. The flour was added to boiling water and mixed well to form a dough and extruded through 1.2 mm aperture die. The extruded noodle strands were steamed for 40 min at atmospheric pressure and dried in a forced hot-air drier at 60° C. for 2 hr. The quality parameters of the noodles produced are listed in Table 1.

TABLE 1

Quality characteristics

| | Parameter | Value |
|---|---|---|
| 1. | Solid loss during 10 min cooking, % | 9.2 |
| 2. | Texture of cooked noodles: Firmness, % | 36.8 |
|    | Elastic recovery, % | 12.1 |
| 3. | W A I, g/g | 5.7 |
| 4. | W S I, % | 4.2 |
| 5. | Amylose content, % | 31.2 |

Although the invention is described in detail with reference to the above examples and embodiments thereof, it will be understood that the variations which are functionally equivalent are within the scope of this invention. Indeed various modifications of the invention in addition to those shown and described herein will become apparent to those skilled in the art of the foregoing description. Such modifications are intended to fall within the scope of the appended claims.

ADVANTAGES OF THE INVENTION

1) The noodles/vermicelli can be prepared from maize which have good cooking and textural properties which was not possible with the hitherto known processes.

2) The process helps in increasing the use of maize as food by converting to a value added product, having less fat with acceptable textural and organoleptic properties and devoid of $SO_2$.

3) It is a simple process.

4) It possible to incorporate, if desired, suitable adjuncts to improve the nutritional, functional or processing quality of the product.

5) The noodles prepared can be cooked to make different end products for consumption for domestic market as well as for export. It can be deep fat fried as a crispy, cooked in water and seasoned to soft snack dish, or boiled in milk and sugar to make a sweet dish.

We claim:

1. Noodles or vermicelli made from maize having the following characteristics:
   a) Solid loss during 10 min cooking % 7.4–9.3
   b) Texture of cooked noodles:
      Firmness % 36.8–39.3
      Elastic recovery % 12.1–12.5
   c) WAI (g/g) 5.4–5.6
   d) WSI % 3.9–4.0
   e) Amylose content % 30.3–31.2.

2. A process for the preparation of the noodles or vermicelli as claimed in claim 1, said process comprising the steps of:
   a) providing maize grits;
   b) soaking the maize grits in an aqueous solution containing sulfur dioxide;
   (c) washing and drying the maize grits and grinding the dried maize grits to form a powder;
   (d) mixing the powder thoroughly with water;
   (e) steaming the mixture of step (d) to form a flour;
   (f) mixing the flour with boiling water to form a dough
   (g) extruding the dough through a press to obtain noodle or vermicelli strands;
   (h) steaming and drying the noodle or vermicelli strands to form said noodles or vermicelli.

3. A process as claimed in claim 2, wherein the step (a) comprises conditioning maize with water, and tempering and milling the conditioned maize in a milling machine to provide the maize grits.

4. A process as claimed in claim 3, comprising, after said step (c), adding salt to said powder formed in step (c).

5. A process as claimed in claim 3, comprising, after said step (c), sieving the powder to break any lumps therein.

6. A process as claimed in claim 4, comprising, sieving the powder to break any lumps therein after addition of said salt.

7. A process as claimed in claim 2, wherein the mixture is steamed in step (e) at atmospheric pressure.

8. A process as claimed in claim 6, wherein the mixture is steamed in step
   (e) at atmospheric pressure.

9. A process as claimed in claim 8, wherein the noodle or vermicelli strands are steamed in step (h) at atmospheric pressure.

10. A process as claimed in claim 2, wherein the aqueous solution in step (b) comprises sodium or potassium metabisulphite.

11. A process as claimed in claim 10, wherein the aqueous solution in step (b) comprise 0.05 to 0.3% sulfur dioxide.

12. A process as claimed in claim 2, wherein the maize grits are ground in step (c) to a powder that is sufficiently fine to pass through a 60 mesh (BS) sieve.

13. A process as claimed in claim 2, comprising adjusting the moisture content of the mixture of step (d) to between 25–28%.

14. A process as claimed in claim 13, wherein the steaming in step (e) is effected for a period ranging from 5 to 30 minutes at atmospheric pressure.

15. A process as claimed in claim 2, wherein the steaming in step (h) is effected for a period of from 20 to 40 minutes at atmospheric pressure.

16. A process as claimed in claim 2, comprising draining excess water prior to said step (c).

* * * * *